July 13, 1948.                 H. BAKER                    2,444,971
                 FILM VIEWER HAVING A MAGAZINE FOR
                     CONSECUTIVELY VIEWING FILMS
                        Filed Feb. 28, 1945

INVENTOR.
HOBART BAKER
BY E. W. Marshall
ATTORNEY

Patented July 13, 1948

2,444,971

UNITED STATES PATENT OFFICE 2,444,971

FILM VIEWER HAVING A MAGAZINE FOR CONSECUTIVELY VIEWING FILMS

Hobart Baker, New Hyde Park, N. Y.

Application February 28, 1945, Serial No. 580,144

11 Claims. (Cl. 40—78)

This invention relates to an improved film viewer and its object is to provide a simple device for magnifying mounted films and examining a plurality of them consecutively. More specifically its object is to provide a magazine for holding such films and a finger actuated mechanism for permitting them to drop one at a time into alinement with a light orifice and a lens and to provide another arrangement for permitting their removal from the device. Another object is to provide a device for feeding mounted films through a projector.

These and other objects will appear in the following specification in which I will describe an embodiment of the invention, the novel features of which will be set forth in claims.

Referring to the drawings.

Figure 1:
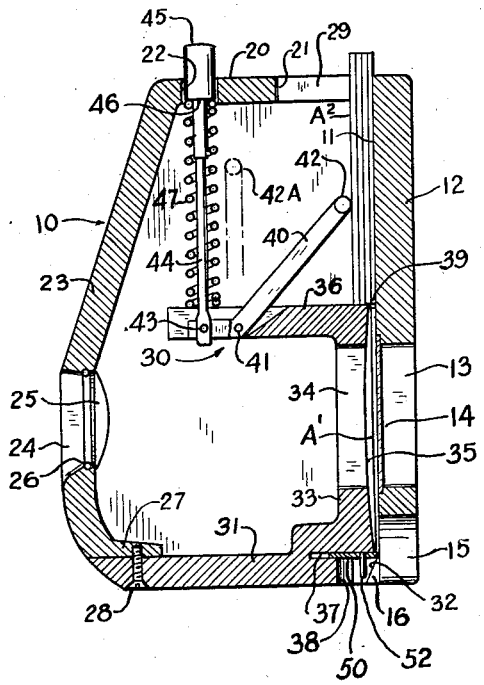
Figure 1 is a sectional side elevation of a film viewer which is made according to and embodies my invention.
Figure 2:
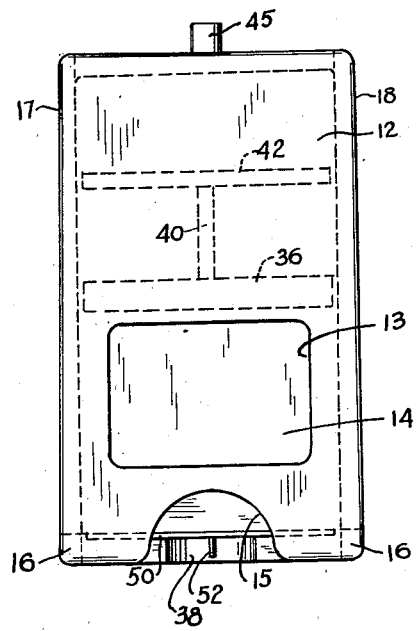
Figure 2 is a front elevation of the device shown in Figure 1.
Figure 3:
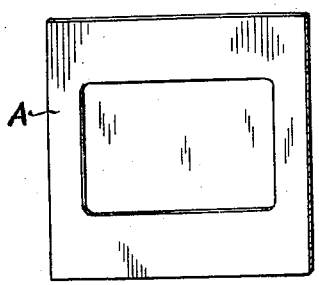
Figure 3 is a top plan view of the device shown in the preceding figures.
Figure 4:
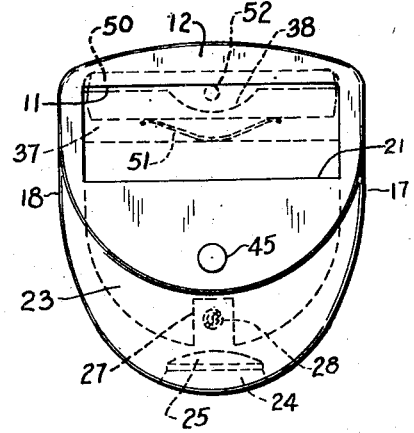
Fig. 4 is a perspective view of a mounted film.

10 is a hollow outer casing which is open at the bottom. The inner surface 11 of its front wall 12 forms the front wall of a magazine. A light opening 13 is cut through the lower part of the wall 12 and is closed by a translucent film or plate 14. The central lower part of the wall 12 is cut away, as shown at 15. Lugs or ears 16 having upwardly inclined inner surfaces extending inwardly from the lower corners of the front wall.

Side walls 17 and 18 extend inwardly from the front wall throughout its length. The parts of their inner surfaces adjacent the front wall are flat and at right angles to the surface 11.

20 is a top wall which has a front edge 21 parallel to and spaced from the surface 11. It is provided with a bore 22 through which a button 45 projects. A rear wall 23, which is integrally connected with the top wall and the side walls, extends downwardly at an angle from the surface 11. It is provided with a shouldered orifice 24, symmetrically disposed in relation to the light opening 13 for the reception of a magnifying lens 25 which is held in place by a split ring 26. 27 is a lug which projects inwardly from the central part of the lower edge of the rear wall. The lower surface of this lug, the lower edge of the rear wall, and the lower edges of the side walls are in a plane at right angles to the surface 11 and above the ears 16.

30 designates an inner member which comprises a base 31 which has a flat upper surface from the front corner of which ears 32 extend. Its flat surface fits against the lower edges of the rear and side walls and the lug 27 and its ears 32 are beveled to fit the ears 16 at the lower corners of the front wall. From the forward edge of the base 31 a frame 33 extends upwardly. This frame is cut out, as at 34, to a size substantially corresponding to that of the light opening 13. Its front surface 35 is slightly concave in relation to the surface 11 of the outer casing. A shelf 36 extends inwardly from the upper end of the frame 33. 37 designates a flat horizontal slot formed in the base 31 with its upper surface substantially parallel with the flat upper surface of the base. The central part of the base is cut away, as shown at 38.

40 is a bell crank lever pivoted to the shelf 36 at 41. At the end of its longer arm is a transverse bar 42. Its shorter arm is pivoted at 43 to a rod 44 which extends from the bottom 45. A shoulder 46 is formed at the lower end of the bottom against which a spring 47, seated on the shelf 36, presses.

A flat slide 50 is guided in the slot 37. This is pressed against the surface 11 by a spring 51. 52 is a pin affixed to the slide 50 extending into the space formed by the cut away portion 38 of the base 31.

When the parts are assembled, the ears 32 at the front corners of the base 31 engage the lugs 16 at the lower corner of the front wall. The inner member is then secured to the outer casing by a screw 28 which passes through the base 31 into the lug 27.

A designates a mounted film such as a transparent colored positive. A rectangular opening 29 is formed in the top of the device between the edge 21 of the top and the rear surface 11 of the front wall and between the sides 17 and 18. This opening, in the particular case illustrated, is proportioned to admit fifteen of these films into the magazine or space above the shelf 36.

A slot 39 is formed between the surface 11 and the upper forward edge of the frame 33 of a width slightly greater than the thickness of one of the mounted films but less than the thickness of two of them. One of the films may pass through this slot onto the slide 50, into the position in which it is shown at A' in Fig. 1. It will then be in registration with the light opening 13 and can be seen through the magnifying lens 25. When it is desired to remove this film, the slide 50 is pushed back from under it by the engagement of the operator's finger on the pin 52.

In Fig. 1 four other films are shown at A², one of which is above and in alinement with the aforesaid slot 39 and three of which rest upon the shelf 36. The bar 42 engages the film at the rear with sufficient pressure caused by the spring 47 to keep these films in the position shown. When the button 45 is depressed, the bar 42 is swung back toward the position in which it is shown at 42A so that pressure on the films is removed. The film over the slot 37 will then drop down into the position A' in the film guide formed between the surfaces 11 and 35. This operation may be repeated until all of the films in the magazine have been passed through the device.

Various modifications in construction, mode of operation, method and use of an invention may and do occur to others, especially after benefitting from knowledge of such disclosure as that herein presented of the principles involved, but the invention itself is not confined to the present showing.

What I claim is:

1. A device of the character described which comprises a casing having a magazine in its upper portion, a film guide below the magazine, a surface forming the front wall of the magazine and of the film guide, said casing being constructed with a light opening adjacent the film guide, and an orifice symmetrically alined with and spaced from the light opening, a pressure device arranged to press a mounted film against the part of the magazine formed by said surface, and means for releasing said pressure device to allow a film to fall by gravity into alinement with the light opening.

2. A device of the character described which comprises a casing having a magazine in its upper portion, a film guide below the magazine, a surface forming the front wall of the magazine and of the film guide, said casing being constructed with a light opening adjacent the film guide and an orifice symmetrically alined with and spaced from the light opening, a pressure device arranged to press a mounted film against the part of the magazine formed by said surface, means for releasing said pressure device to allow the film to fall by gravity, and a releasable means at the end of the film guide for arresting the film in alinement with the light opening.

3. A device of the character described comprising a magazine adapted to hold a plurality of mounted films, a film guide below the magazine, a surface forming the front wall of the magazine and of the film guide, a pressure device arranged to press the films toward said surface, and means for releasing the pressure device to allow the films to fall singly by gravity from the magazine into the film guide.

4. A device of the character described comprising a magazine adapted to hold a plurality of mounted films, a film guide below the magazine, a surface forming the front wall of the magazine and of the film guide, a pressure device arranged to press the films toward said surface, a slot of less width than the thickness of two of said films interconnecting the magazine and the film guide, and means for releasing the pressure device to allow the films to fall singly by gravity from the magazine into the film guide.

5. A device of the character described comprising a magazine adapted to hold a plurality of mounted films, a film guide below the magazine, a surface forming the front wall of the magazine and of the film guide, a pressure device arranged to press the films toward said surface, a slot of less width than the thickness of two of said films interconnecting the magazine and the film guide, means for releasing the pressure device to allow the films to fall singly by gravity from the magazine into the film guide, a stop for arresting the film in the guide, and means for displacing the stop.

6. A device of the character described comprising a magazine adapted to hold a plurality of mounted films, a film guide below the magazine, a surface forming the front wall of the magazine and of the film guide, a shelf adapted to support films in the magazine, the front edge of the shelf being separated from said surface a distance less than the thickness of two of the films and providing a space interconnecting the magazine and the film guide, a pressure device arranged to press films in the magazine toward said surface, and means for releasing the pressure device to allow a film to fall by gravity from the magazine into the film guide.

7. A device of the character described comprising a magazine adapted to hold a plurality of mounted films, a film guide below the magazine, a surface forming the front wall of the magazine and of the film guide, a shelf adapted to support films in the magazine, the front edge of the shelf being separated from said surface a distance less than the thickness of two of the films and providing a space interconnecting the magazine and the film guide, a pressure device arranged to press films in the magazine toward said surface, means for releasing the pressure device to allow a film to fall by gravity from the magazine into the film guide, and releasable means at the end of the film guide for arresting a film.

8. A device of the character described comprising a magazine adapted to hold a plurality of mounted films, a film guide below the magazine, a surface forming the front wall of the magazine and of the film guide, a shelf adapted to support films in the magazine, the front edge of the shelf being separated from said surface a distance less than the thickness of two of the films and providing a space interconnecting the magazine and the film guide, a spring pressed element arranged to force films in the magazine toward said surface, and means for moving said element out of contact with the films whereby the film adjacent the front wall of the magazine will fall by gravity through the space interconnecting the magazine and the film guide.

9. A device of the character described comprising a magazine adapted to hold a plurality of mounted films, a film guide below the magazine, a surface forming the front wall of the magazine and of the film guide, a shelf adapted to support films in the magazine, the front edge of the shelf being separated from said surface a distance less than the thickness of two of the films and providing a space interconnecting the magazine and the film guide, a spring pressed element arranged to force films in the magazine toward said surface, means for moving said element out of contact with the films, whereby the film adjacent the front wall of the magazine will fall by gravity through the space interconnecting the magazine and the film guide, a spring pressed stop for arresting a film in the guide, and means for displacing the stop.

10. A device of the character described which comprises a casing having a magazine in its upper portion adapted to hold a plurality of mounted films, a film guide below the magazine, a surface forming the front wall of the magazine and of the film guide, a shelf adapted to support films in the magazine, the front edge of the shelf being separated from said surface a distance less than the thickness of two of the films and providing a space interconnecting the magazine and the film guide, a spring pressed element arranged to force films in the magazine against said surface, means projecting through the casing for moving said element out of contact with the films, whereby the film adjacent the front wall of the magazine will fall by gravity through the space interconnecting the magazine and the film guide, said casing being constructed with a light opening adjacent the film guide and a sight orifice symmetrically alined with and spaced from the light opening, a lens in said orifice, and releasable means at the end of the film guide for arresting a film in registration with the light opening.

11. A device of the character described which comprises a casing having a magazine in its upper portion adapted to hold a plurality of mounted films, a film guide below the magazine, a surface forming the front wall of the magazine and of the film guide, a shelf adapted to support films in the magazine, the front edge of the shelf being separated from said surface a distance less than the thickness of two of the films and providing a space interconnecting the magazine and the film guide, a spring pressed element arranged to force films in the magazine against said surface, means projecting through the casing for moving said element out of contact with the films, whereby the film adjacent the front wall of the magazine will fall by gravity through the space interconnecting the magazine and the film guide, said casing being constructed with a light opening adjacent the film guide and a sight orifice symmetrically alined with and spaced from the light opening, a lens in said orifice, a spring pressed slide at the end of the film guide for arresting a film in registration with the light opening, and means for displacing said slide.

HOBART BAKER.

REFERENCES CITED

The following references are of record in the file of this patent:

UNITED STATES PATENTS

| Number | Name | Date |
| --- | --- | --- |
| 1,016,677 | Dannheiser | Feb. 6, 1912 |
| 1,752,952 | Jelinek | Apr. 1, 1930 |